(12) United States Patent
Bucove

(10) Patent No.: US 10,890,235 B2
(45) Date of Patent: Jan. 12, 2021

(54) FURNITURE LOCK OUT SYSTEM

(71) Applicant: L&P PROPERTY MANAGEMENT COMPANY, South Gate, CA (US)

(72) Inventor: Jennie Bucove, New York, NY (US)

(73) Assignee: L&P PROPERTY MANAGEMENT COMPANY, South Gate, CA (US)

( * ) Notice: Subject to any disclaimer, the term of this patent is extended or adjusted under 35 U.S.C. 154(b) by 0 days.

(21) Appl. No.: 15/235,649

(22) Filed: Aug. 12, 2016

(65) Prior Publication Data
US 2017/0042331 A1 Feb. 16, 2017

Related U.S. Application Data

(60) Provisional application No. 62/205,235, filed on Aug. 14, 2015.

(51) Int. Cl.
| | |
|---|---|
| *A47C 1/031* | (2006.01) |
| *A47C 1/022* | (2006.01) |
| *F16H 21/44* | (2006.01) |
| *A47C 1/032* | (2006.01) |
| *A47C 1/026* | (2006.01) |

(52) U.S. Cl.
CPC ............ *F16H 21/44* (2013.01); *A47C 1/026* (2013.01); *A47C 1/03238* (2013.01)

(58) Field of Classification Search
CPC ..... F16H 21/44; A47C 1/026; A47C 1/03238; A47C 1/024; A47C 1/0305; A47C 1/0307; A47C 1/0265; A47C 1/030205; A47C 1/023; A47C 1/0246; A47C 1/025; A47C 1/027; A47C 1/0303; A47C 1/032; A47C 1/03222; A47C 1/03233; A47C 3/02; A47C 3/025; A47C 3/0257; A47C 3/027; A47C 3/03
USPC ........................................................ 297/244.11
See application file for complete search history.

(56) References Cited

U.S. PATENT DOCUMENTS

| | | | | |
|---|---|---|---|---|
| 780,252 | A * | 1/1905 | Wylie ..................... | A47C 1/026 297/371 |
| 2,603,275 | A * | 7/1952 | Kuebler ................. | A47C 1/026 297/353 |
| 3,302,969 | A * | 2/1967 | Mizelle .................. | A47C 3/027 297/85 R |
| 3,339,972 | A * | 9/1967 | Fletcher ............... | A47C 1/0355 297/259.2 |
| 3,464,736 | A * | 9/1969 | Mizelle ................. | A47C 1/0345 297/84 |

(Continued)

*Primary Examiner* — Kyle J. Walraed-Sullivan
(74) *Attorney, Agent, or Firm* — Shook, Hardy & Bacon L.L.P.

(57) ABSTRACT

A furniture system includes a base, a first linkage and a second linkage. The base is configured to be disposed on a flat surface and to be connected to an article of furniture. The first linkage is connected to the base and configured to be connected to the article of furniture. The first linkage is configured to be actuated to cause the article of furniture to translate relative to the base. The second linkage is connected to the first linkage. The second linkage is biased into a locked state in which the second linkage prevents movement of the first linkage. The second linkage is configured to be actuated by an applied force into an unlocked state in which the second linkage allows movement of the first linkage (and the article of furniture to which the first linkage is configured to be connected).

18 Claims, 20 Drawing Sheets

(56) References Cited

U.S. PATENT DOCUMENTS

| | | | | |
|---|---|---|---|---|
| 3,475,051 A | * | 10/1969 | Crawford | A47C 1/0345 297/69 |
| 3,519,240 A | * | 7/1970 | Swenson | B60N 2/525 248/573 |
| 3,637,255 A | * | 1/1972 | Re | A47C 1/0345 297/85 R |
| 3,638,995 A | * | 2/1972 | Flanagan | A47C 1/0355 297/85 L |
| 3,652,127 A | * | 3/1972 | Freedman | A47C 1/026 297/372 |
| 3,727,974 A | * | 4/1973 | Swenson | A47C 3/025 297/300.3 |
| 3,869,169 A | * | 3/1975 | Johnson | A47C 7/506 297/84 |
| 4,212,494 A | * | 7/1980 | Dabney | A47C 3/027 297/69 |
| 4,437,701 A | * | 3/1984 | Mizelle | A47C 1/034 297/267.1 |
| 4,519,647 A | * | 5/1985 | Rogers, Jr. | A47C 1/0355 297/259.2 |
| 4,707,025 A | * | 11/1987 | Rogers, Jr. | A47C 1/0345 297/259.2 |
| 4,801,177 A | * | 1/1989 | Kanazawa | A47C 1/026 297/366 |
| 5,328,235 A | * | 7/1994 | Saul | A47C 1/0352 297/270.1 |
| 5,419,611 A | * | 5/1995 | Cook | A47C 1/0355 297/75 |
| 5,485,979 A | * | 1/1996 | LaPointe | A47C 3/027 248/188.2 |
| 5,527,095 A | * | 6/1996 | Marshall | A47C 1/0352 297/258.1 |
| 5,800,009 A | * | 9/1998 | Grandfield | A47C 1/0345 297/68 |
| 5,954,392 A | * | 9/1999 | Liss | A47C 1/0352 297/85 L |
| 5,975,627 A | * | 11/1999 | LaPointe | A47C 1/0355 297/68 |
| 6,000,754 A | * | 12/1999 | Lawson | A47C 1/0355 297/259.2 |
| 6,120,094 A | * | 9/2000 | Parent | A47C 3/0255 297/270.1 |
| 6,145,924 A | * | 11/2000 | Mero, Jr. | A47C 1/0352 297/452.18 |
| 6,213,551 B1 | * | 4/2001 | Desnoyers | A47C 3/025 297/270.2 |
| 6,402,247 B1 | * | 6/2002 | Schmitt | B60N 2/203 297/357 |
| 6,733,071 B2 | * | 5/2004 | Guillot | A47C 1/0355 297/259.2 |
| 7,040,692 B1 | * | 5/2006 | Pine | A47C 1/0355 297/270.2 |
| 7,275,789 B2 | * | 10/2007 | LaPointe | A47C 3/021 297/258.1 |
| 8,123,288 B2 | * | 2/2012 | Murphy | A47C 1/0355 297/85 R |
| 9,427,371 B1 | * | 8/2016 | Lamar | A47C 1/032 |
| 2002/0043853 A1 | * | 4/2002 | Shephard | B60N 2/20 297/367 R |
| 2003/0047982 A1 | * | 3/2003 | Ball | A47C 1/023 297/452.29 |
| 2003/0057743 A1 | * | 3/2003 | May | A47C 1/0355 297/84 |
| 2004/0000803 A1 | * | 1/2004 | Guillot | A47C 1/0355 297/270.1 |
| 2005/0067867 A1 | * | 3/2005 | May | A47C 3/027 297/270.1 |
| 2006/0138844 A1 | * | 6/2006 | LaVoie | B60N 2/01583 297/378.12 |
| 2006/0284461 A1 | * | 12/2006 | Michael | A47C 1/026 297/300.1 |
| 2013/0334855 A1 | * | 12/2013 | Chen | A47C 3/03 297/313 |
| 2014/0191552 A1 | * | 7/2014 | Weber | A63B 22/0046 297/344.21 |
| 2014/0265497 A1 | * | 9/2014 | Hough | A61G 5/14 297/316 |
| 2015/0001902 A1 | * | 1/2015 | Ellington | A47C 1/023 297/353 |

* cited by examiner

FURNITURE LOCK OUT SYSTEM

PRIORITY APPLICATION

This application claims priority to U.S. Provisional Application Ser. No. 62/205,235 filed Aug. 14, 2015, the disclosure of which is incorporated herein in its entirety by reference.

BACKGROUND

Recliners, gliders and other seating furniture can have movable elements that can be repositioned to change the seating position of a seated person. The movable elements can often be configured to be repositioned while a seated person remains seated on the furniture item. The movable elements can include reclining backrests, extendable foot rests and seats that rock or glide (for example, parallel or generally parallel to the floor). Typically, the movable elements are moved manually and/or by the weight of the seated person. Certain adjustable furniture can include springs or other biasing elements for returning the adjustable elements to or biasing the adjustable elements into predetermined configurations. The adjustability of the movable elements may be particularly advantageous for the care of elderly and infirm persons, who can require a more reclined seating position to be comfortable or for health reasons and/or who may have a more limited ability to manually control movement of such articles of furniture.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
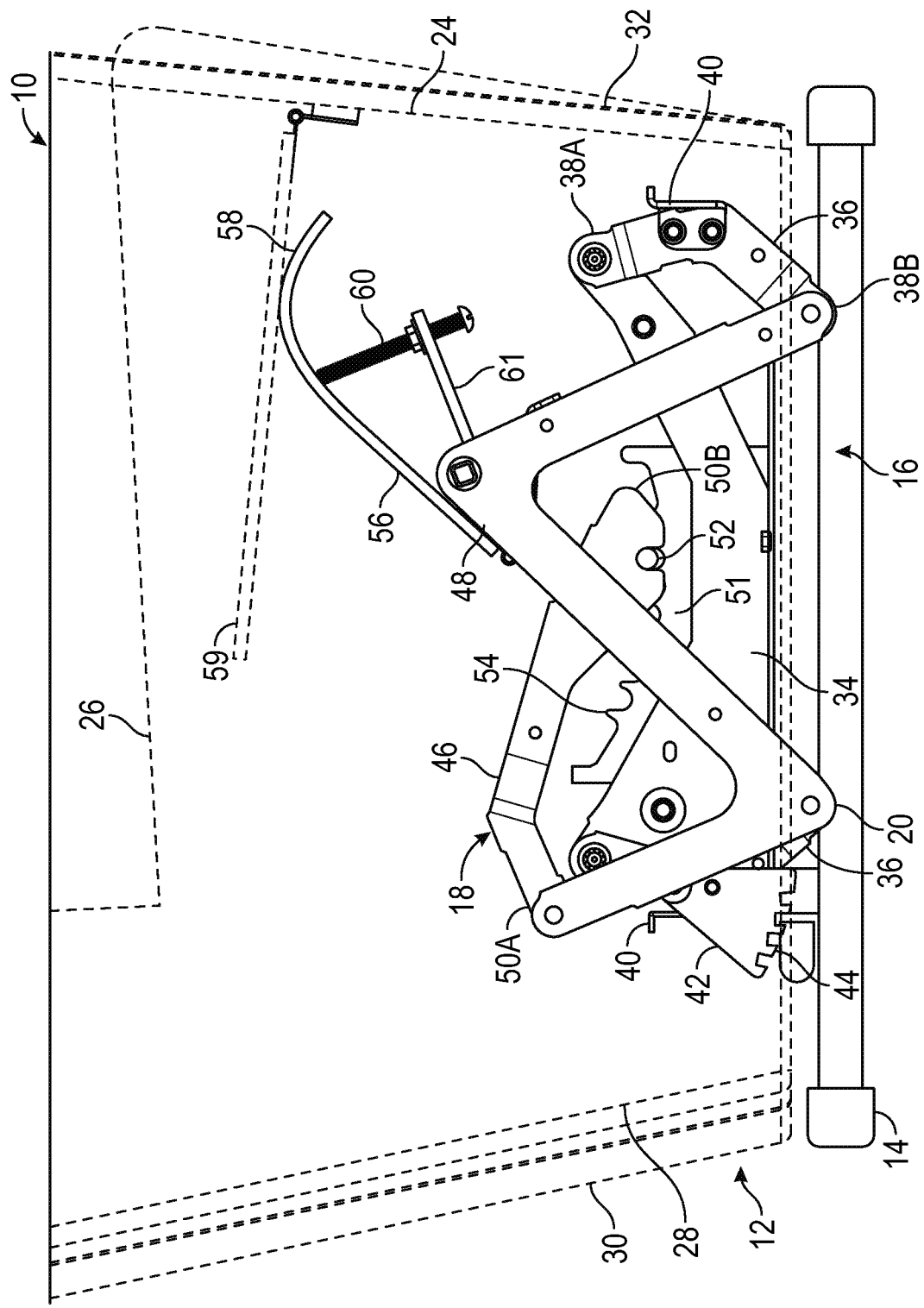
FIG. 1 is a schematic diagram of a furniture system according to an example of the present disclosure.
Figure 2:
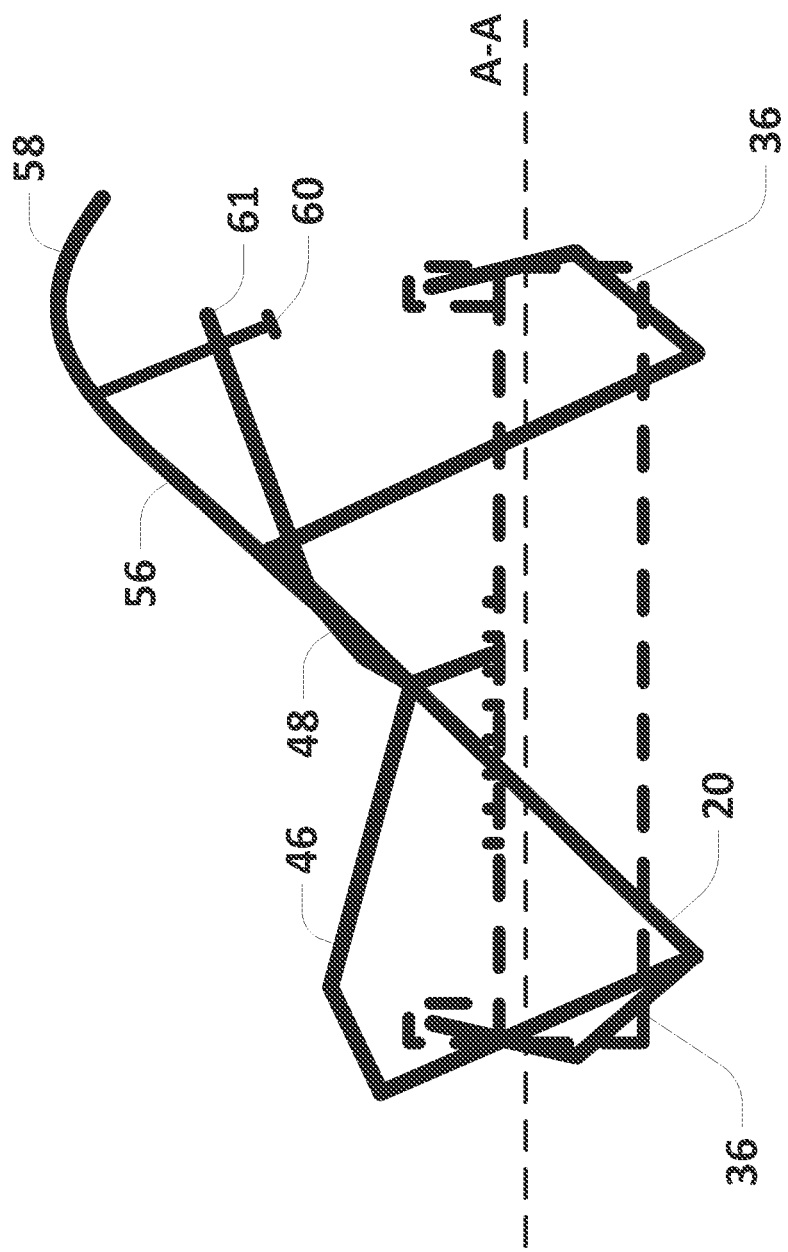
FIG. 2 is a schematic of a furniture item according to an example of the present disclosure, wherein a locking assembly is engaged to prevent movement of a translation assembly.
Figure 3:
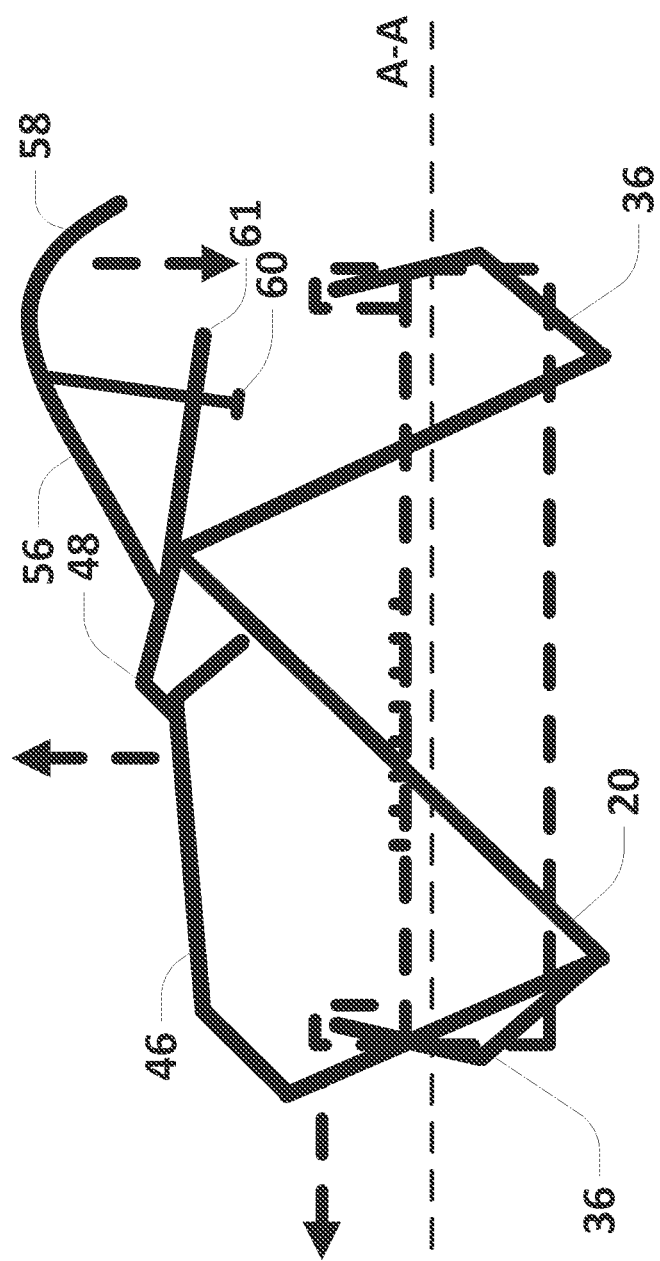
FIG. 3 is a schematic of a furniture item according to an example of the present disclosure, wherein a locking assembly is disengaged to allow movement of a translation assembly.

Unintended movement of movable elements of an article of manufacture while a person sits on, is in the act of sitting down on, or is in the act of standing up from such furniture can result in a fall or undesired contortion of the person, which, in turn, can result in injury or other untoward consequences. Such consequences of unintended movement may be of particular risk to elderly and infirm people. Biasing elements can exaggerate the movement of the movable elements further complicating or exacerbating consequences to the person using the furniture. Certain seating elements have a lever or other manually operated lock for fixing the movable elements. However, elderly or infirm people may not be able to manipulate the lever to lock the movable elements or may inadvertently operate the lever and unlock the movable elements. The present inventors have recognized, among other things, that a problem to be solved includes automatically fixing/locking the movable elements of an article of furniture to prevent uncontrolled or unintended reconfiguration of such furniture. The term automatic, as used in this disclosure, may mean causing some result without requiring an action by a user of furniture including example systems, devices, and/or methods in accordance with this disclosure.

Examples in accordance with this disclosure can provide seating furniture having movable elements and a locking assembly operated by the weight of a person using the furniture. The seating furniture can include a translation assembly positioned within a seat box of the furniture item, the translation assembly including a primary linkage movable to adjust the position of the seat box or other movable elements. A locking assembly can be operably mounted to the translation assembly; the locking assembly can include a locking arm rotatably mounted to the primary linkage. The locking arm can be rotated into engagement with a stationary structure to prevent movement of the primary linkage and correspondingly the seat box or other movable elements. A pivot arm can be rotated/actuated (by an applied forces such as the weight of a person sitting down) to lift the locking arm out of engagement with the stationary structure to allow movement of the primary linkage and correspondingly the seat box and the movable elements.

One example includes a furniture system including a base, a translation assembly and a locking assembly. The translation assembly can include at least one primary linkage and at least one secondary linkage rotatably mounted to each primary linkage, wherein the at least one primary linkage can be translated relative to the base to pivot each corresponding secondary linkage. The locking assembly can include a lock arm rotatably mounted to each primary linkage. Each lock arm can be rotated between an unlocked position in which the lock arm is disengaged to the base to allow translation of the primary linkage and a lock position in which the lock arm is engaged to the base to prevent translation of the primary linkage.

Another example includes a furniture system that is configured to act as the base and movement mechanism for an article of furniture like a chair. The system includes a base, a first linkage and a second linkage. The base is configured to be disposed on a flat surface and to be connected to an article of furniture. The first linkage is connected to the base and configured to be connected to the article of furniture. The first linkage is configured to be actuated to cause the article of furniture to translate relative to the base. The second linkage is connected to the first linkage. The second linkage is biased into a locked state in which the second linkage prevents movement of the first linkage. The second linkage is configured to be actuated by an applied force into an unlocked state in which the second linkage allows movement of the first linkage (and the article of furniture to which the first linkage is configured to be connected).

FIG. 1 is an elevation view depicting a moveable furniture item 10 including a locking assembly 18, which can automatically allow and prevent movement of a primary linkage 20, to thereby allow and prevent movement of the furniture item. Different aspects, structure, features and functions of example furniture item 10 are depicted in and described with reference to FIGS. 1-8.

Figure 4:
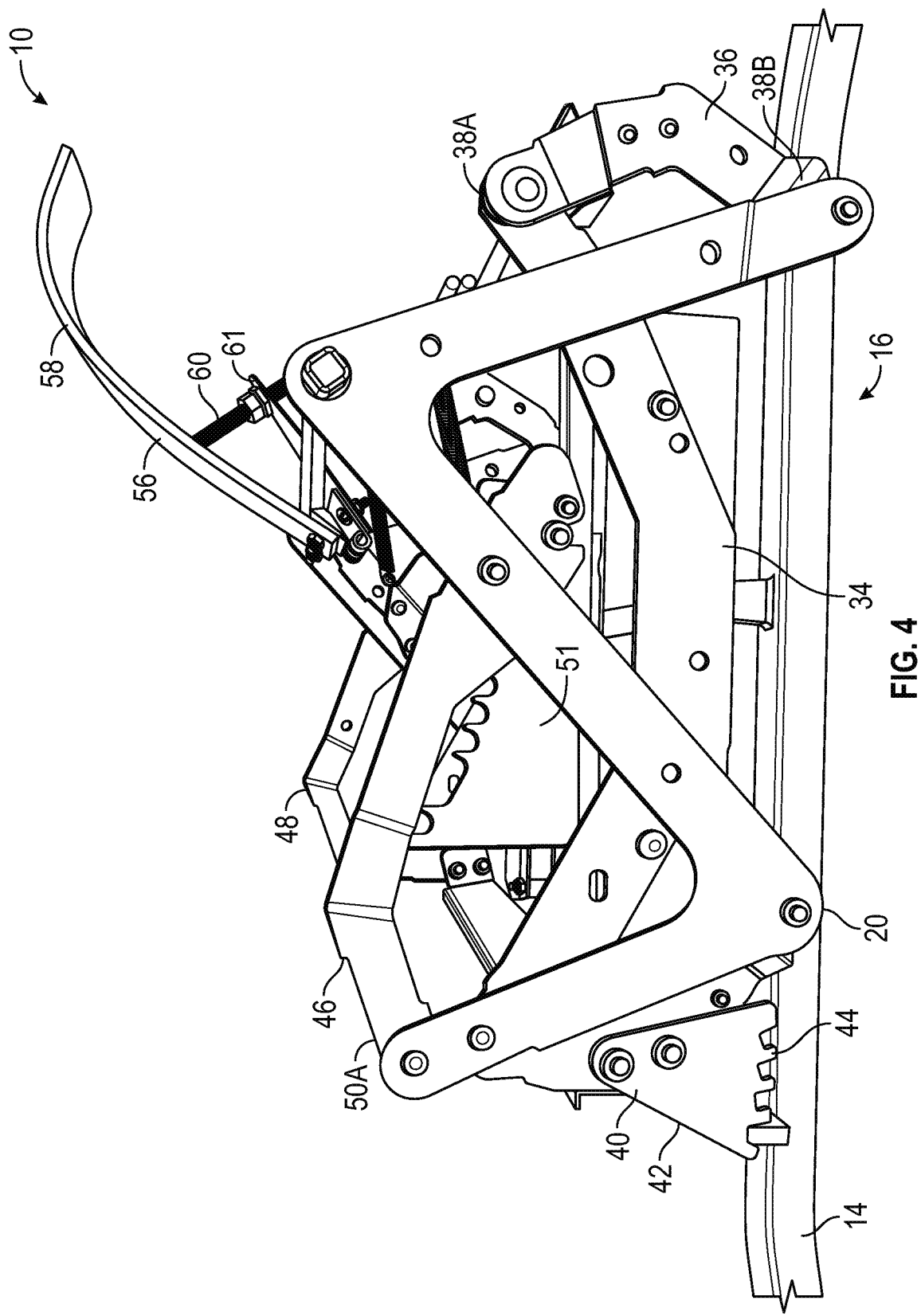
FIG. 4 is a side view of a translation assembly and locking assembly of a furniture system according to an example of the present disclosure.

As depicted in FIGS. 1 and 4, a furniture item 10, according to at least one example of the present disclosure, can include a seat box 12, a base 14, a translation assembly 16 and a locking assembly 18. The translation assembly 16 can further include at least one primary linkage 20 movable relative to the base 14 to reposition at least one of the seat box 12 or another movable element relative to the base 14. Such a movable element can include, for example, a reclining back rest, an extendable furniture foot rest, a pivotable back rest, an adjustable arm rest or combinations thereof. The locking assembly 18 can be configured to be positioned or set to multiple states, for example an unlock and a lock state, which can automatically (for example, in response to an force applied and removed by a person sitting down and standing up, respectively) allow and prevent movement of the primary linkage 20, which, in turn can allow movement of the seat box 12 (or another moveable element) when a person is seated on the seat box 12 and prevent movement when the person stands up.

As depicted in FIG. 1, in at least one example, the seat box 12 can include a front panel 24, at least two side walls 26 and a rear panel 28. The front panel 24, side walls 26 and the rear panel 28 can cooperate to define a seat opening. A backrest 30 can be mounted to the seat box 12 adjacent the rear panel 28. In at least one example, the backrest 30 can be pivotably mounted to the seat box 12 such that the back rest 30 can be pivoted relative to the rear panel 28. The back rest 30 can be operably connected to the primary linkage 20 such that the movement of the primary linkage 20 pivots the back rest 30 between at least a reclined position and an upright position. A foot rest 32 can be mounted to the seat box 12 adjacent the front panel 24. In at least one example, the foot rest 32 can be pivotably mounted to the seat box 12 such that the foot rest 32 can be pivoted relative to the front panel 24. The foot rest 32 can be operably connected to the primary linkage 20 such that the movement of the primary linkage 20 pivots the foot rest 32 between at least an extended position and a retracted position.

Figure 5:
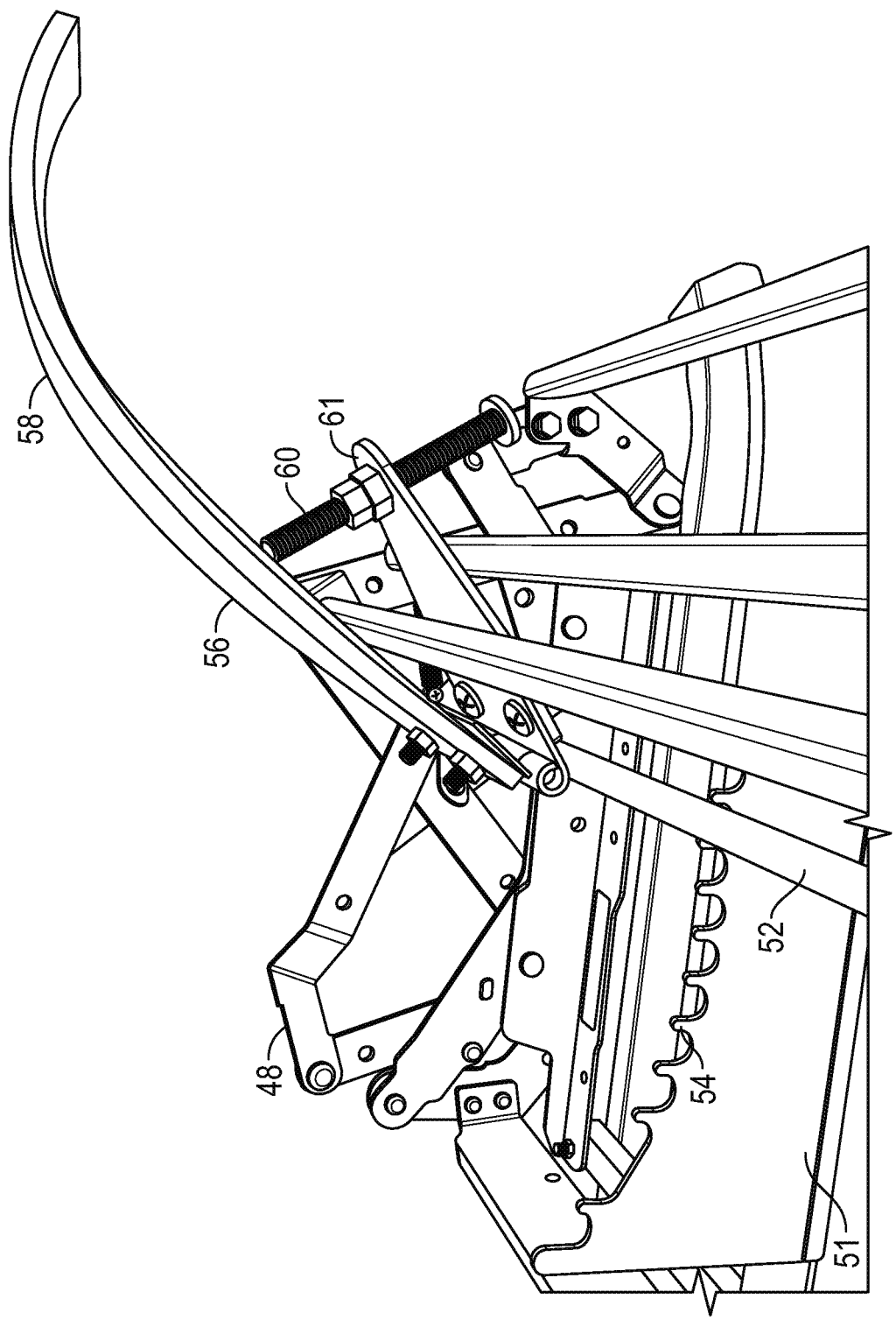
FIG. 5 is a partial perspective view of the locking assembly depicted in FIG. 4.
Figure 6:
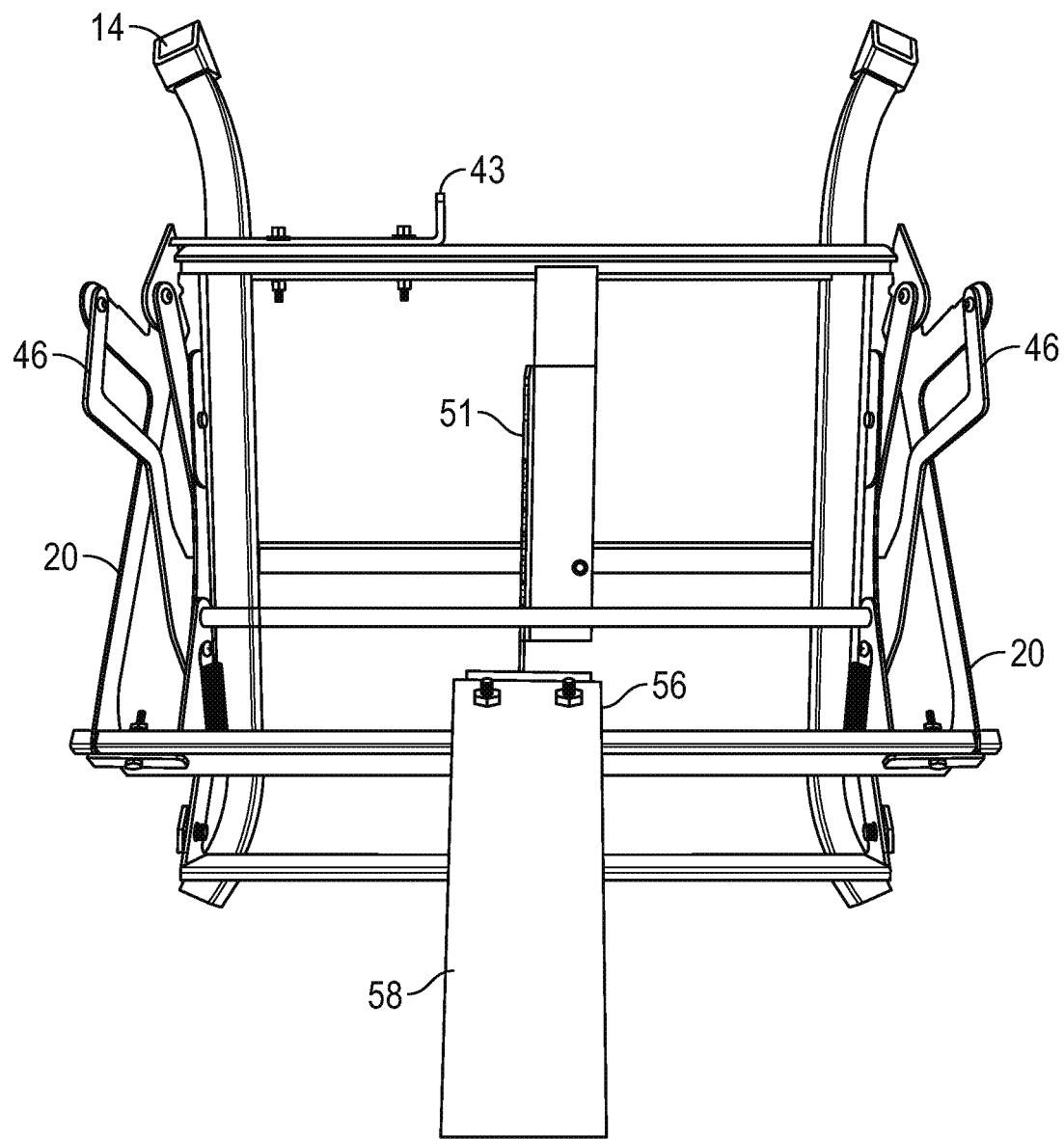
FIG. 6 is a top view of the translation assembly and locking assembly depicted in FIG. 4.

As depicted in FIGS. 1-4, in at least one example, the translation assembly 16 can include at least one primary linkage 20, a base plate 34 and at least one secondary linkage 36 corresponding to each primary linkage 20. Each secondary linkage 36 can include a first end 38A and a second end 38B. The first end 38A of each secondary linkage 36 can be rotatably connected to the base plate 34 and the second end 38B can be rotatably connected to the primary linkage 20. In at least one example, the translation assembly 16 can include at least two secondary linkages 36 corresponding to each primary linkage 20 such that the primary linkage 20 can translate relative to the base plate 34 along a primary axis A-A by pivoting the secondary linkages 36. In at least one example, each secondary linkage 36 can include at least one mounting bracket 40 for operably connecting the corresponding secondary linkage 36 to a movable element. In this configuration, the translation of the primary linkage 20 along axis A-A can pivot the secondary linkages 36 and moves the corresponding at least one movable element. As depicted in FIGS. 5 and 6, in at least one example, the translation assembly 16 can include at least two primary linkages 20 positioned parallel, where each include at least one secondary linkage 36 rotatably connecting the primary linkage 20 to the base 14.

Figure 8:
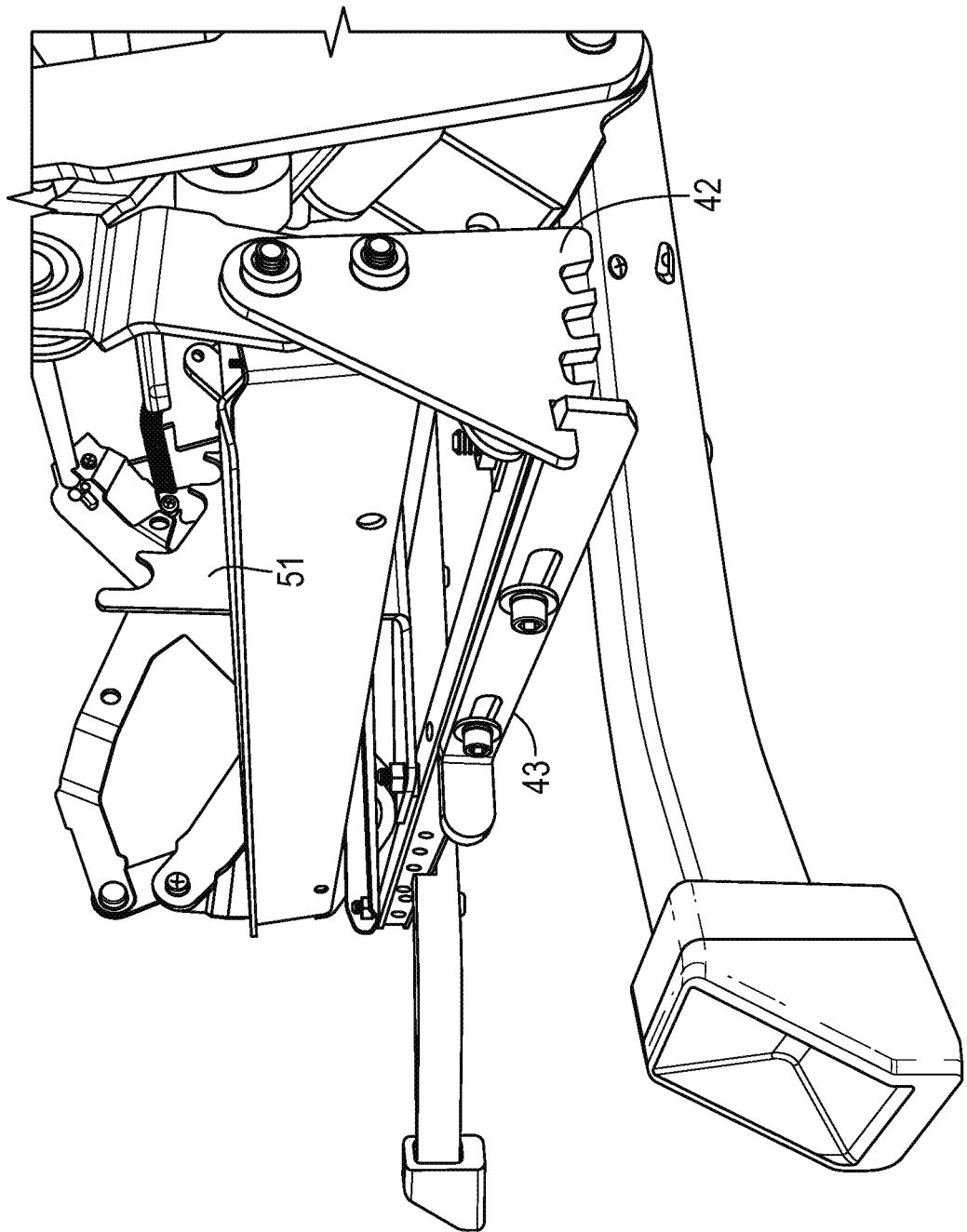
FIG. 8 is a partial perspective view of a lock plate of the translation assembly depicted in FIG. 4.

As depicted in FIGS. 1 and 8, in at least one example, a lock plate 42 can be mounted to at least one of the secondary linkages 36. The lock plate 42 can be configured to rotate with the corresponding secondary linkage 36 when the primary linkage 20 is translated along axis A-A. The lock plate 42 can define a plurality of teeth 44 for receiving a locking element to fix rotation of the lock plate 42, which correspondingly prevents rotation of the secondary linkage 36 and translation of the primary linkage 20. The locking element can comprise a removable rod or rigid element configured to engage the teeth 14 and can be engaged to the base 14 or base plate 34 to prevent movement of the lock plate 42 and correspondingly the secondary linkage 36 and the primary linkage 20. As depicted in FIG. 8, in at least one example, a slidable rod 43 can be mounted to the base 14. The slidable rod 43 can be slid between a lock position in which the rod 43 engages the teeth 44 of the lock plate 42 to prevent rotation of the secondary linkages 36 and an unlock position in which the rod 43 is disengaged from the teeth 44 permitting rotation of the secondary linkages 36.

Figure 7:
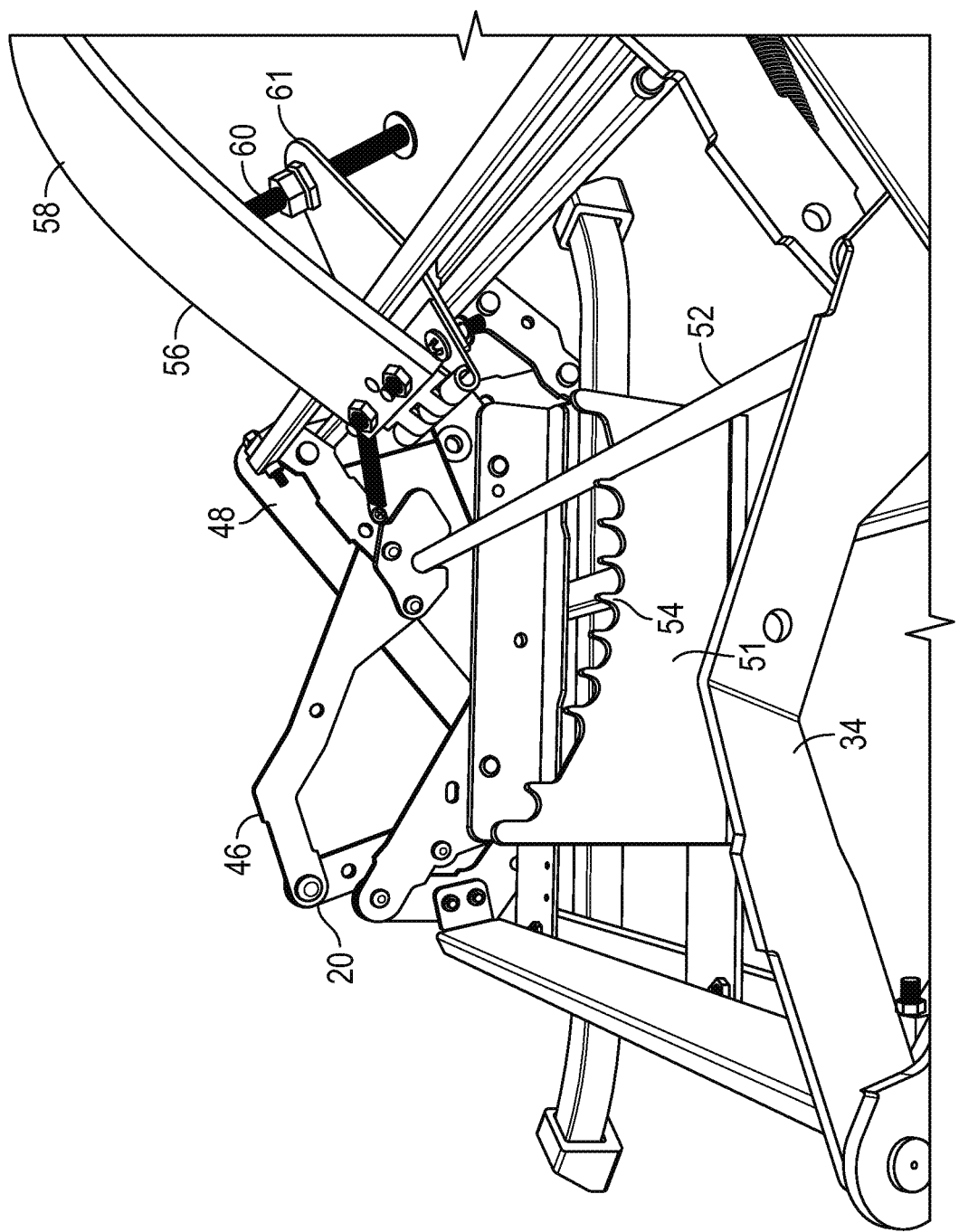
FIG. 7 is a partial perspective view of the translation assembly and locking assembly depicted in FIG. 4.

As depicted in FIGS. 1-4, the locking assembly 18 can include a lock arm 46 and a pivot arm 48. The lock arm 46 can define a first end 50A that can be rotatably mounted to the primary linkage 20 and a second end 50B that can be coupled to a locking element to selectively engage the ratchet 51 to prevent translation of the primary linkage 20 and rotation of the secondary linkages 36. In at least one example, the lock arm 46 can include a stud 52 that can be engaged to teeth 54 defined by the ratchet 51. As depicted in FIGS. 6 and 7, in at least one example, each locking assembly 18 can comprise at least one lock arm 46 corresponding to each primary linkage 20, wherein the stud 52 extends between parallel lock arms 46. The pivot arm 48 can be rotatably engaged to the primary linkage 20 and can be operably engaged to the lock arm 46 such that rotation of the pivot arm 48 lifts the second end 50B and thereby stud 52 out of engagement with the ratchet 51, allowing translation of the primary linkage 20 and rotation of the secondary linkage 36.

As depicted in FIGS. 1-5 and 7, in at least one example, the pivot arm 48 can include a lift arm 56 extending from the pivot arm 48. The lift arm 56 can include a weight sensing end 58 positioned adjacent the seat box opening. In operation, a person sitting on a seating surface of the seat box 12 can apply pressure to the weight sensing end 58 of the lift arm 56 causing the pivot arm 48 to rotate into an unlock position lifting the second end 50B of the lock arm 46, which functions to lift stud 52 out of engagement with the ratchet 51. When the person stands removing the pressure from the weight sensing end 58, the pivot arm 48 can rotate into a locked position lowering the second end 50B of the lock arm 46, which functions to lower stud 52 into engagement with the ratchet 51 and lock the translation assembly 16. As depicted in FIG. 6, in at least one example, the lift arm 56 can comprise a curved surface for providing increased surface area receiving the weight of the person seated on the seating surface and for translating the translational applied force into rotation of the lift arm 56 and pivot arm 48. In at least one example, the pivot arm 48 can further include a spring 49 biasing the pivot arm 48 toward the locked position.

As depicted in FIG. 1, in at least one example, the seat box 12 can further include a seat panel 59 positioned within the seat opening beneath the seating surface. The seat panel 59 can be rotatably mounted to front panel 24 such that sitting on seating surface rotates the seat panel 59 relative to the front panel 24. The weight sensing end 58 of the lift arm 56 can be positioned to engage the seat panel 59 such that rotation of the seat panel 59 rotates the lift arm 56 and disengages the lock assembly 18. In at least one example, the weight sensing end 58 can be curved to provide continuous transfer of pressure from the seated person to the lift arm 56.

As depicted in FIGS. 1 and 5, in at least one example, the lift arm 56 can be rotatably mounted to the pivot arm 48 such that the lift arm 56 can be rotated relative to the pivot arm 48. In this configuration, the pivot arm 48 can further include an adjustment arm 61 and a set screw 60. The adjustment arm 61 extends from the pivot arm 48 while the set screw 60 extends between the adjustment arm 61 and the lift arm 56. The effective length of the set screw 60 between the adjustment arm 61 and the lift arm 56 can be adjusted to change the angle between the lift arm 56 and the pivot arm 48. An increased angle between the lift arm 56 and the pivot arm 48 can allow the lift arm 56 to engage the person at a higher height allowing earlier rotation of the pivot arm 48 and disengagement of the locking assembly 18. Similarly, a decreased angle between the lift arm 56 and the pivot arm 48 can allow the lift arm 56 to engage the person at a lower height and delaying rotation of the pivot arm 48 and disengaging of the locking assembly 18.

Figure 9:
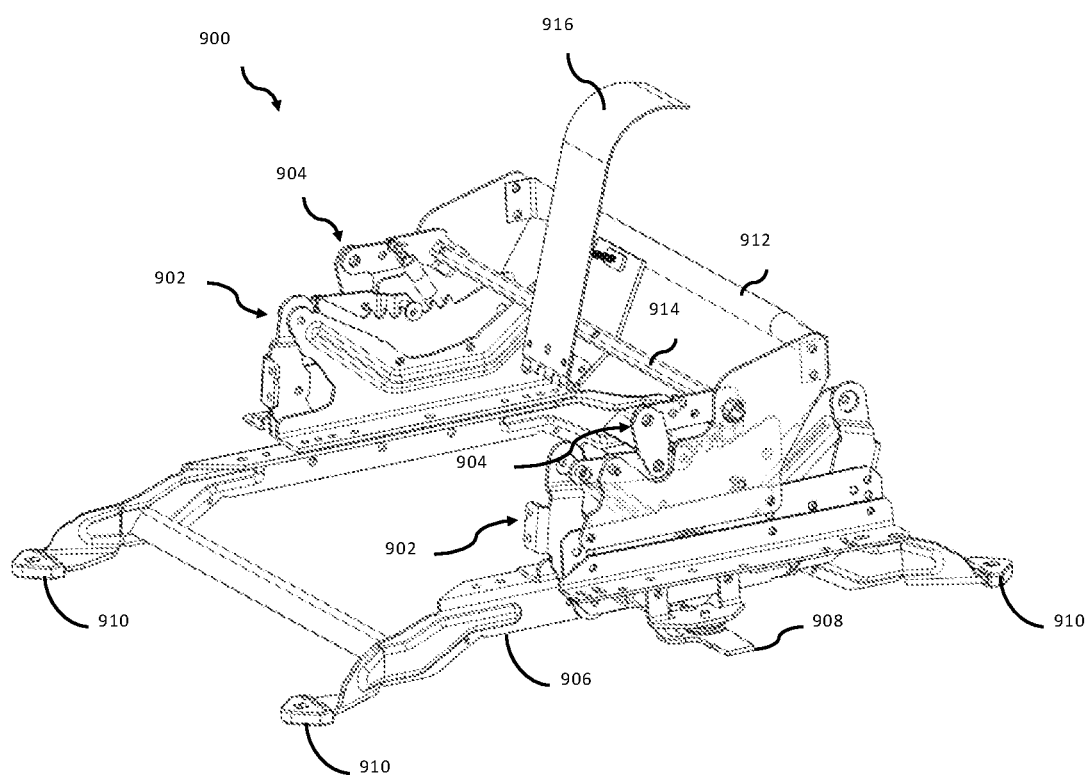
FIG. 9 is a perspective view depicting another example furniture system in accordance with this disclosure.

FIG. 9 is a perspective view depicting another example furniture system 900 in accordance with this disclosure. Different aspects, structure, features and functions of example furniture system 900 are depicted in and described with reference to FIGS. 9-15B. Furniture system 900 can function as the base and auto-locking movement mechanism for an article of seating or other furniture, including, for example, a chair. Furniture system 900 includes a glider linkage 902, to which the frame and other structures of an article of seating furniture can be connected to allow the seating furniture to glide (translate in two opposing directions along a path that is generally or approximately linear and is generally or approximately parallel to the ground), for example forward and backward. Glider linkage 902 is coupled to an auto-lock linkage 904, which is configured to automatically lock movement of the glider linkage when a person stands up from the seating furniture and to automatically unlock the glider linkage when a person sits down on the seating furniture.

In FIG. 9, furniture system 900 includes glider linkage 902, auto-lock linkage 904, base 906, and manual lock 908. Base 906 is a frame or base structure to which the glider linkage 902 is connected and relative to which the glider linkage (and associated furniture, for example, seating furniture) moves. Base 906 has four foot pads 910 that are configured to be disposed on the floor, ground or other flat surface on which furniture system 900 and associated seating furniture is configured to be disposed. Glider linkage 902 is coupled to base 906 and the base functions as ground (sometimes also referred to as "frame" or "frame link") for the kinematic mechanism including the glider linkage.

As depicted in the perspective view of FIG. 9, furniture system 900 includes two glider linkages 902 and two auto-lock linkages 904 disposed on either side of base 906. The two glider linkages 902 are respectively coupled to sides of base 906 and to each other by cross bar 912. The two auto-lock linkages 904 are respectively coupled to the two glider linkages 902 and to each other by a common pivot bar 914. In the depicted examples of furniture system 900, pivot bar 914 is an elongated square tube with rounded corners. However, in other examples, such a pivot bar may be a cylindrical or other shaped tube or solid bar.

Pivot paddle 916 is disposed and connected adjacent the middle of pivot bar 914. Pivot paddle 916 transfers an applied force, which results from a person sitting down on or standing up from seating furniture connected to furniture system 900, to pivot bar 914 to thereby automatically actuate auto-lock linkage 904.

Furniture system 900 also includes manual lock 906. Manual lock 906 can be manually operated to lock movement of glider linkage 902 regardless of the state of auto-lock linkage 904 (for example, regardless of whether auto-lock linkage 904 is engaged to lock glider linkage 902 or disengaged to unlock glider linkage 904). In this manner, manual lock 908 operates as a manual override to auto-lock linkage 904. As the two glider linkages 902 are operably coupled by cross bar 912, one manual lock 908 can lock movement of both glider linkages 902.

Figure 10A:
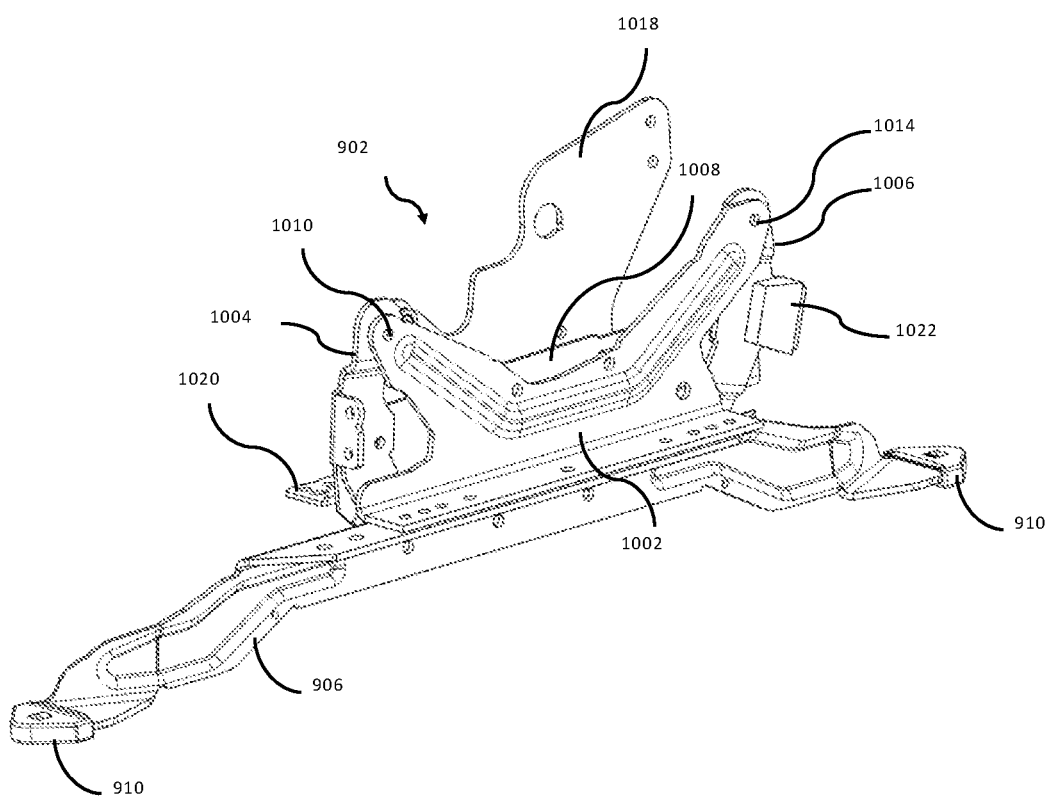
FIGS. 10A and 10B are perspective views depicting a first linkage of the system of FIG. 9.
Figure 10B:
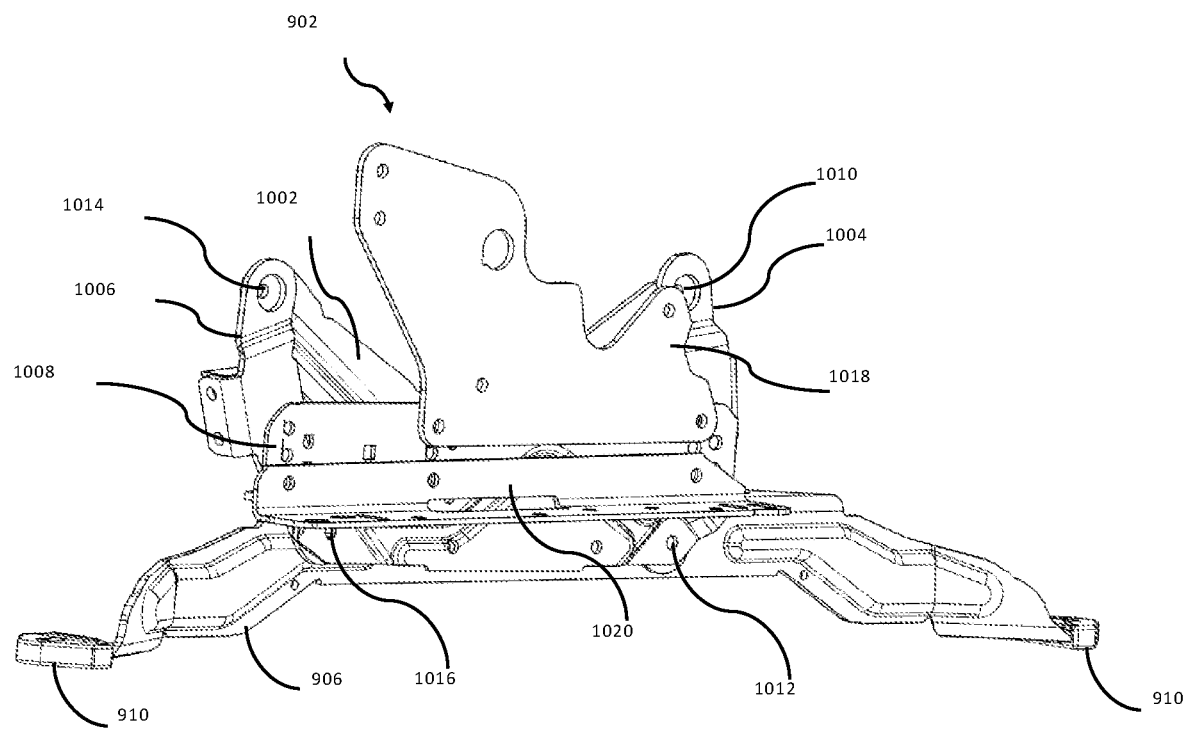

FIGS. 10A and 10B are perspective views depicting glider linkage 902. In FIGS. 10A and 10B, glider linkage 902 includes ground link 1002, first link 1004, second link 1006, and glider link 1008. Ground link 1002 is connected to and in fixed relationship with base 906 of furniture assembly 900. One end of first link 1004 is pivotally connected to ground link 1002 at pivot 1010. The other end of first link 1004 is pivotally connected to glider link 1008 at pivot 1012. One end of second link is pivotally connected to ground link 1002 at pivot 1014. The other end of second link 1004 is pivotally connected to glider link 1008 at pivot 1016.

Glider linkage 902 is a four-bar linkage with ground link 1002 connecting the linkage to a stationary structure (for example, base 906 in the depicted example). (The "ground" link of a linkage is sometimes referred to as a "frame" or "frame link".) First and second links 1004, 1006, respectively, of glider linkage 902 can be moved to produce a desired resultant movement of glider link 1008 (and other structures connected thereto, including, for example, an article of furniture) along a path dictated by the positions, lengths, and operable range of motions of the ground and first and second links. In the example of glider linkage 902, one of the first and second links 1004, 1006 may be referred to as the drive or crank and the other may be referred to as the follower. Additionally, glider link 1002 may be referred to as a connecting link. In other examples according to this disclosure, glider linkage 902 could be a different type of kinematic mechanism or other mechanism with equivalent mechanical and kinematic properties.

Glider linkage 902 also includes cross-bar plate 1018 and frame plate 1020. Cross-bar plate 1018 and frame plate 1020 are fixedly coupled to and move with glider link 1008. Referring to FIG. 9 and FIGS. 10A and 10B, cross-bar plate 1018 is connected to cross bar 912, which, in turn, is connected to another cross-bar plate 1018 of the other glider linkage 902 of furniture system 900. Frame plate 1020 is configured to connect to a frame of an article of furniture to enable the furniture to move, i.e. glide in accordance/synchrony with movement of glider linkage 902 and, in particular in accordance/synchrony with movement of glider link 1008 of glider linkage 902.

Figure 11:
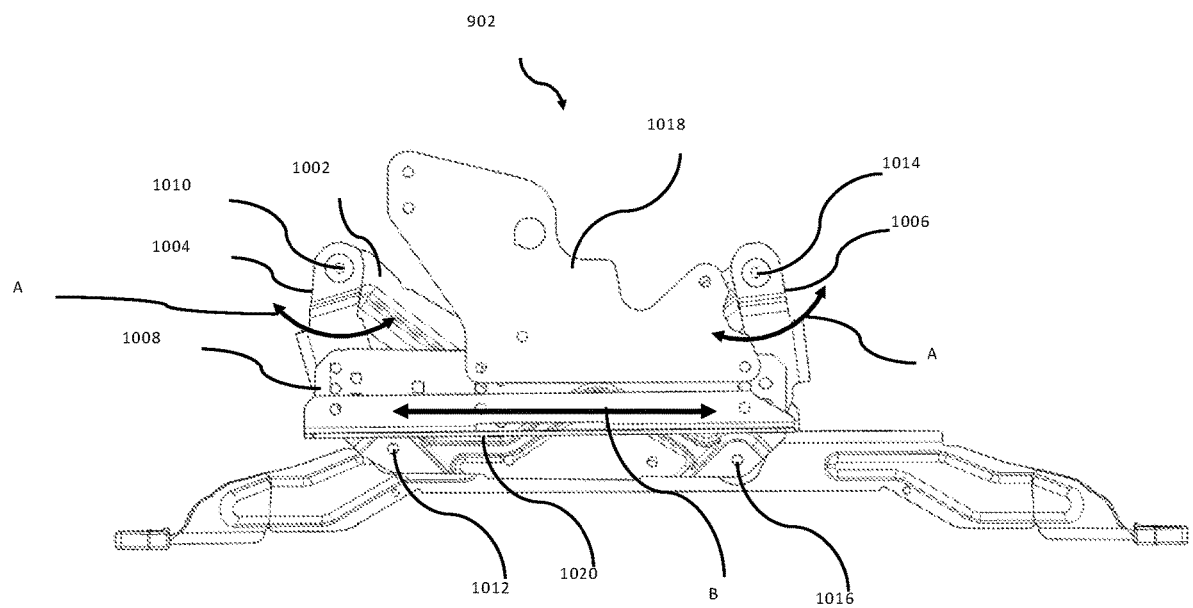
FIG. 11 is an elevation view depicting movement of the first linkage.

FIG. 11 is an elevation view depicting movement of glider linkage 902 of example furniture system 900. First link 1004 and second link 1006 are configured to rotate (in two opposing directions) about pivots 1010, 1014, respectively, as indicated by arrows A in FIG. 11. Rotation of first and second links 1004, 1006 cause glider link 1008, and thereby cross-bar plate 1018 and frame plate 1020 to translate in the directions indicated by arrow B. Thus, rotation of first and second links 1004, 1006 cause frame plate 1020 and the article of furniture connected thereto to move forward and backward along an approximately linear path approximately parallel to the ground on which base 906 lies to generate a back and forth movement commonly referred to as gliding.

Referring again to FIG. 10A, glider linkage 902 also includes stop block 1022 connected to a flange of second link 1006. Stop block 1022 can be a rubber, foam, wood, metal, or other material block that is configured to engage ground link 1002 (or some other structure) to provide a mechanical limit on translation of glider linkage 902 in one of the directions indicated by arrow B in FIG. 11. It is noted that although only one stop block 1022 is depicted in the example of FIG. 10A, another such stop block could also be coupled to, for example, first link 1004 to engage ground link 1002 (or some other structure) to provide a mechanical limit on translation of glider linkage 902 in the other of the directions indicated by arrow B in FIG. 11.

Figure 12A:
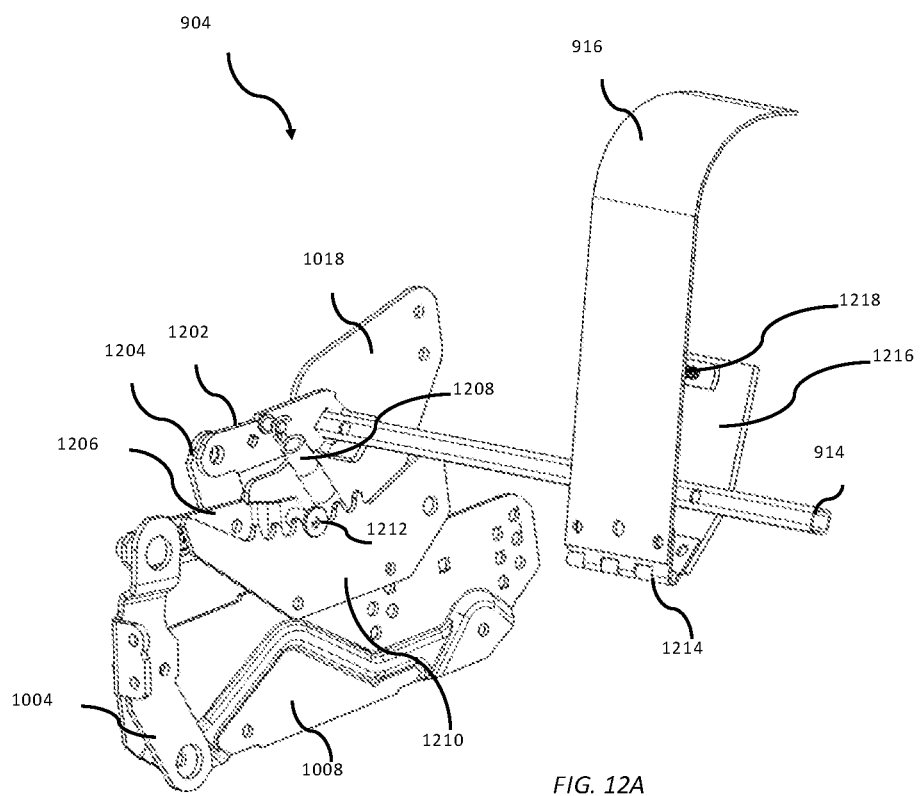
FIGS. 12A and 12B are perspective views depicting a second linkage of the system of FIG. 9.
Figure 12B:
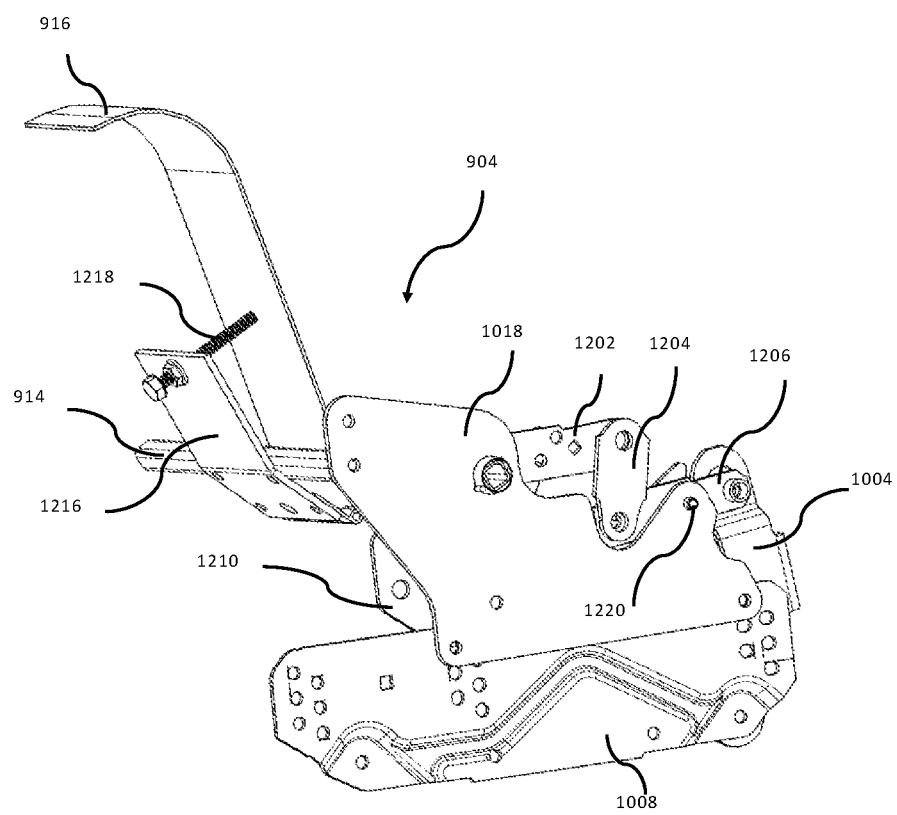

FIGS. 12A and 12B are perspective views depicting auto-lock linkage 904 of example furniture system 900. Referring to FIGS. 12A and 12B, auto-lock linkage 904 includes pivot bar 914, pivot paddle 916, first link 1202, second link 1204, third link 1206, spring 1208, ratchet 1210 and catch 1212. Auto-lock linkage 904 also includes hinge 1214, hinge plate 1216 and set screw 1218.

As noted above, auto-lock linkage 904 is connected to glider linkage 902. As shown in FIGS. 12A and 12B, one end of first link 1202 of auto-lock linkage 904 is connected to pivot bar 914, which is pivotally connected cross-bar plate 1018 of glider linkage 902. One end of third link 1206 of auto-lock linkage 904 is pivotally connected to cross-bar plate 1018 of glider linkage 902 at pivot 1220. In this manner, cross-bar plate 1018 of glider linkage 902 forms the ground link of auto-lock linkage 904. As cross-bar plate 1018 is connected to glider link 1002, the ground link of auto-lock linkage 904 is connected to a moveable element of glider linkage 902, which results in auto-lock linkage 904 as a whole moving in accordance/synchrony with movement of glider linkage 902. The other end of first link 1202 is pivotally connected to one end of second link 1204 of auto-lock linkage 902. Catch 1212 is connected to the other end of third link 1206. The other end of second link 1204 is pivotally connected to third link 1206 between the two opposite ends of the third link.

Although base 906 and ground plate 1002 are not shown in FIGS. 12A and 12B, ratchet 1210 of auto-lock linkage 904 is connected to ground plate 1002, which fixedly connects ratchet to base 906. Thus, ratchet 1210 is fixed to the base and does not move relative thereto. In FIGS. 12A and 12B, auto-lock linkage 904 is depicted in a locked state such that catch 1212 is received by and engaged with teeth of ratchet 1210. Spring 1208 is connected between first link 1202 and base 906 or another component fixed thereto. Spring 1208 is configured to bias auto-lock linkage 904 into the locked state by biasing catch 1212 into engagement with the teeth of ratchet 1210.

Similar to glider linkage 902, auto-lock linkage 904 is also a four-bar linkage. However, in the case of auto-lock linkage 904, the ground link (or frame) is not fixed to a stationary structure, but, instead is formed from cross-bar plate 1018 associated with glider linkage 902. Thus, although auto-lock linkage 904 can move (for example, be actuated to move between an unlocked and locked state) independent of movement of glider linkage 902, auto-lock linkage 904 as a whole is grounded to a moveable element of and moves with glider linkage 902. In the case of auto-lock linkage 904, first link 1202 is the driver or crank, which is "driven" to produce a desired resultant movement of third link 1206. Second link 1204 may be referred to as the connecting link in auto-lock linkage. Thus, first link 1202 of auto-lock linkage 904 can be moved to drive a desired resultant movement of third link 1206 (and other structures connected thereto, including, for example, catch 1212) by way of second link 1204 connected between the first and second links. Movement of third link 1206 can be along a path dictated by the positions, lengths, and operable range of motions of the ground and first and second links 1202, 1204, respectively. In other examples according to this disclosure, auto-lock linkage 902 could be a different type of kinematic mechanism or other mechanism with equivalent mechanical and kinematic properties.

Figure 13A:
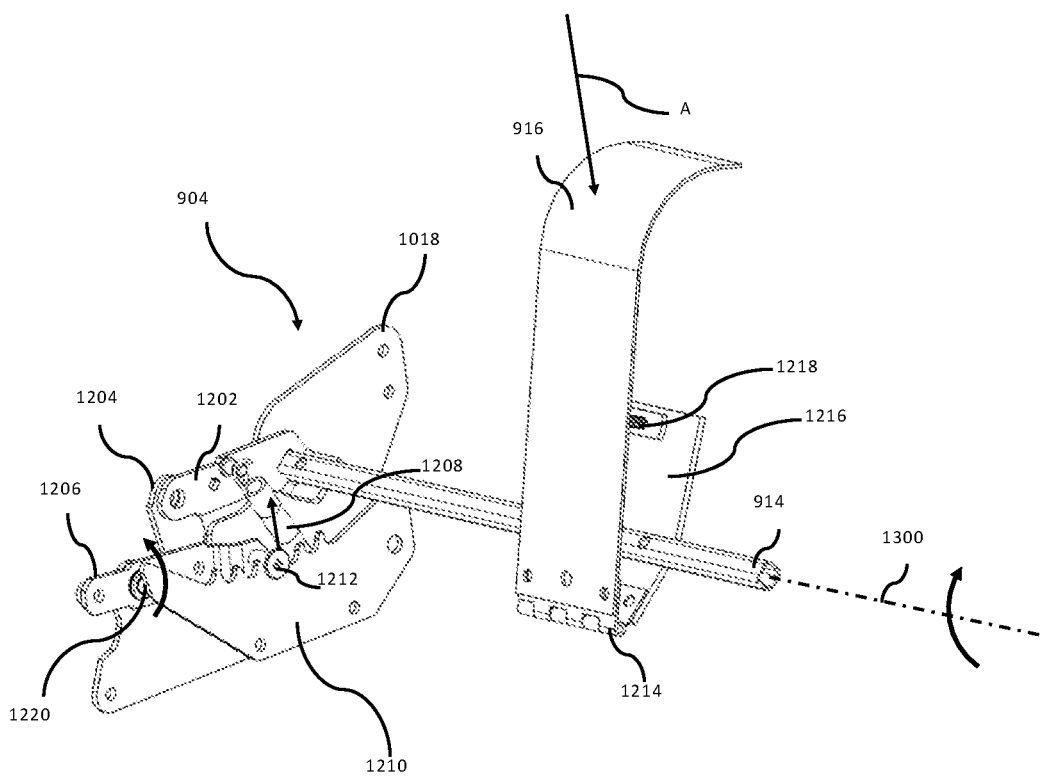
FIGS. 13A and 13B are perspective views depicting movement of the second linkage.
Figure 13B:
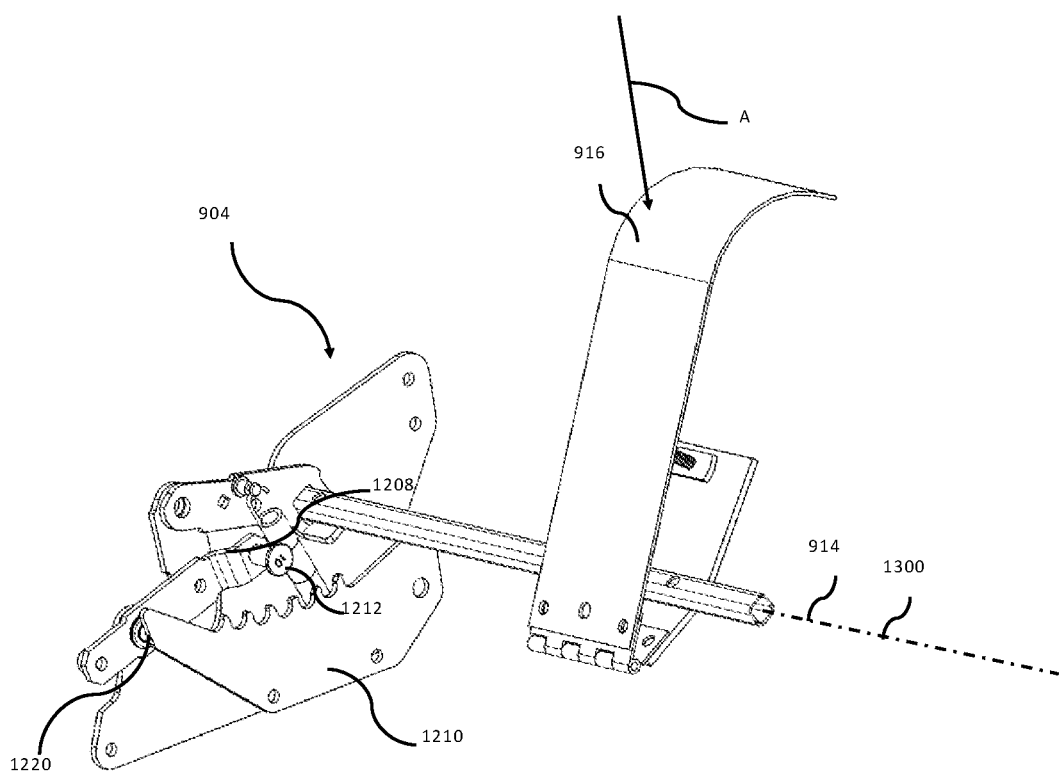

FIGS. 13A and 13B are perspective views depicting movement of auto-lock linkage 904 of example furniture system 900. In FIG. 13A, auto-lock linkage 904 is in a locked state in which catch 1212 is received by and engaged with teeth of ratchet 1210. As explained above, spring 1208 automatically biases auto-lock linkage 904 into the locked state of FIG. 13A. In FIG. 13B, auto-lock linkage 904 is in an unlocked state in which catch 1212 is disengaged from ratchet 1210. In the state depicted in FIG. 13A, the glider linkage 902 and associated article of furniture are prevented from moving by auto-lock linkage 904.

A force or load applied by a person sitting down on an article of furniture including furniture assembly 900, as indicated by arrow A in FIGS. 13A and 13B, will cause pivot paddle 916 to move. Pivot paddle 916 transfers the load applied by the sitting person to auto-lock linkage 904 and, in particular, the load applied to pivot paddle 916 causes pivot bar 914 to rotate about a pivot axis 1300 of the pivot bar. First link 1202 and pivot bar 914 are fixedly coupled such that rotation of pivot bar 914 causes rotation of first link 1202. Rotation of first link 1202 of auto-lock linkage 904 causes second link 1204 to rotate third link 1206 about pivot 1220. Rotation of third link 1206 causes catch 1212 to move up and disengage from ratchet 1210, which moves auto-lock linkage 904 from the locked state depicted in FIG. 13A to the unlocked state depicted in FIG. 13B. As long as the force applied by a person sitting on an article of furniture including furniture assembly 900 is greater than the spring constant of spring 1208, auto-lock linkage 904 will remain in an unlocked state, thereby allowing movement of glider linkage 902 and the article of furniture (as long as manual lock 908 is unlocked/disengaged). When the person sitting on the furniture or some other applied force is removed from pivot paddle 916, spring 1208 will automatically bias auto-lock linkage 904 into the locked state and will thereby lock glider linkage 902, guarding against movement of the article of furniture when the person is in the act of standing up or sitting down.

Figure 14A:
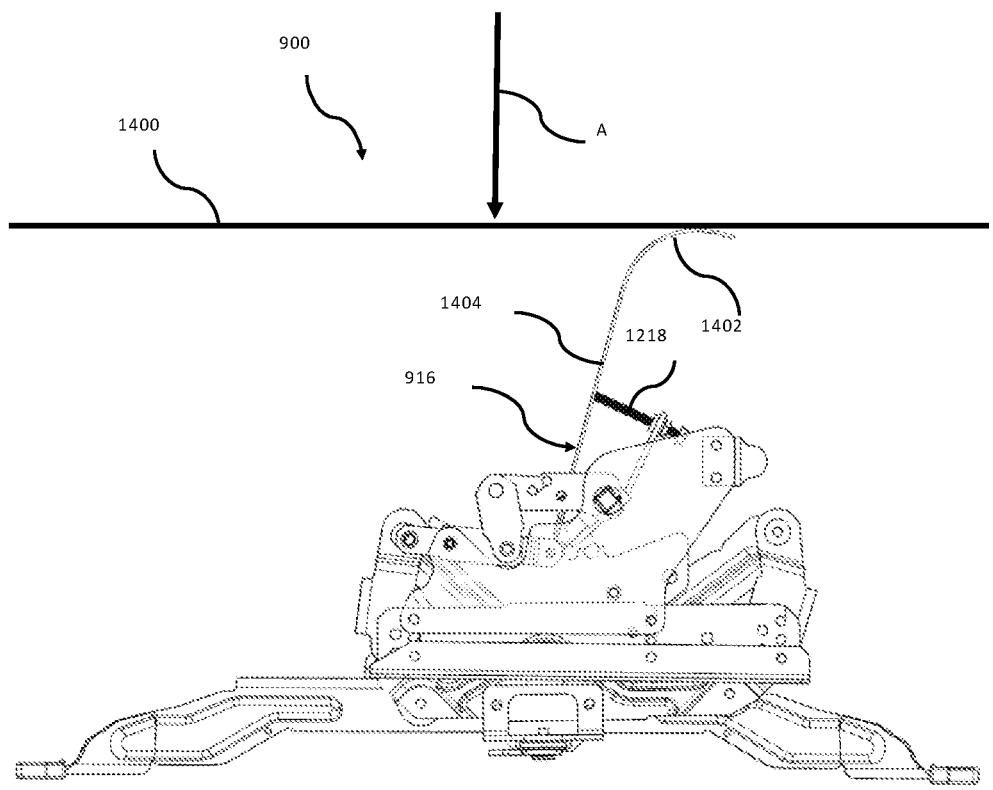
FIGS. 14A and 14B are elevation views of the example furniture system of FIG. 9 with the second linkage in a locked state and an unlocked state, respectively.
Figure 14B:
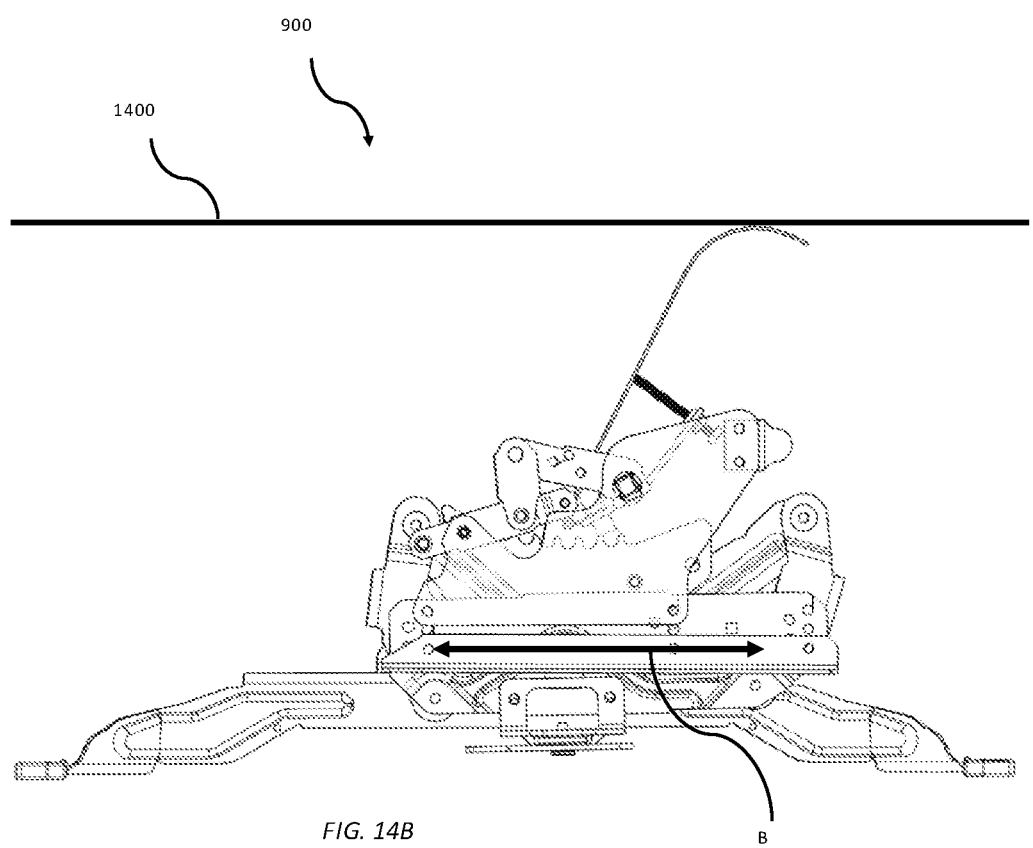

FIGS. 14A and 14B are elevation views of example furniture system 900 with auto-lock linkage 904 in a locked state and an unlocked state, respectively. FIGS. 14A and 14B schematically represent a bottom plate 1400 of a seating box of an article of furniture including furniture system 900. Pivot paddle 916 is configured and arranged to be engaged by bottom plate 1400 in the presence of an applied force, for example from a person sitting on the furniture, which applied force is generally indicated by arrow A.

Bottom plate 1400 schematically illustrates some frame or other element of the article of furniture to which furniture assembly 900 is configured to be connected, and for which furniture assembly is configured to act as a base and movement mechanism. Bottom plate (or some other actual element of an article of furniture) is a generally planar, flat element or includes a generally planar, flat portion that is positioned to engage pivot paddle 916 (and, in particular, curved distal end 1402 of the pivot paddle). The applied force caused by a person sitting on the furniture is a translational force (that is a force applied and effectuating a translation along a generally linear path as opposed to an applied torque that causes rotation). The direction of such an applied force is generally downward (assuming furniture system 900 and associated furniture are disposed on the ground or some other surface generally parallel to the ground) and may also be or approximated as generally perpendicular to the planar, flat bottom plate 1400 (or planar, flat portion thereof).

Pivot paddle 916 is configured to translate the approximately straight downward applied force into rotation of the paddle and pivot bar 914. In order to translate the approximately linear or translational applied force into rotation, pivot paddle 916 includes a curved distal end 1402. Thus, pivot paddle 916 includes a substantially straight (or flat or linear) portion 1404 extending from a proximal end connected to hinge 1214 to curved distal end 1402. Straight portion 1404 thereby spans most of the distance between furniture system 900 and bottom plate 1400 of an associated seating box of an article of furniture and curved distal end 1402 is configured and arranged to engage with bottom plate 1400 and to translate a translational applied force into rotational movement to actuate auto-lock linkage 904. Curved distal end 1404 of pivot paddle 916 is configured to slide against bottom plate 1400, as bottom plate 1400 moves downward and pivot paddle rotates under the applied force.

As depicted in FIGS. 12A-14B, pivot paddle 916 can be adjustably mounted to the pivot bar 914 such that the pivot paddle can be rotated relative to the pivot bar via hinge 1214 and set screw 1218. Pivot paddle 916 is connected to hinge 1214, which is connected to hinge plate 1216. Hinge plate 1216 is connected to pivot bar 914. Set screw 1218 is coupled to hinge plate 1216 and extends between the hinge plate and pivot paddle 916. The effective length of the set screw 1218 between hinge plate 1216 and pivot paddle 916 can be adjusted to change the angle between the pivot paddle and pivot bar 914. An increased angle between pivot paddle 916 and pivot bar 914 can allow the paddle to engage a person at a higher height allowing earlier rotation of the pivot bar and disengagement of auto-lock linkage 904. Similarly, a decreased angle between pivot paddle 916 and pivot bar 914 can allow the paddle to engage a person at a lower height and delay rotation of the pivot bar and disengagement of auto-lock linkage 904.

Figure 15A:
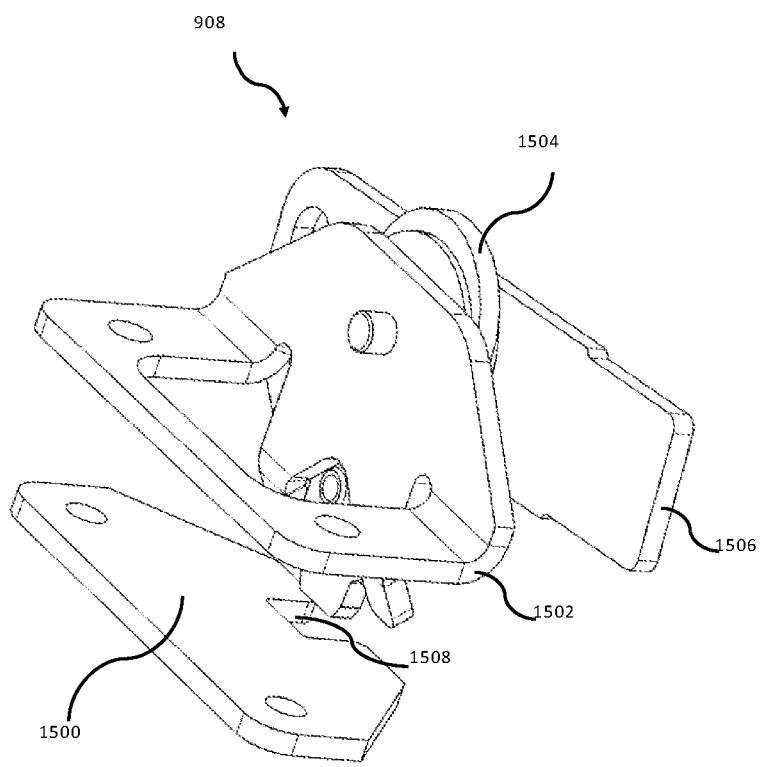
FIGS. 15A and 15B depict a manual lock of the example furniture system of FIG. 9.
Figure 15B:
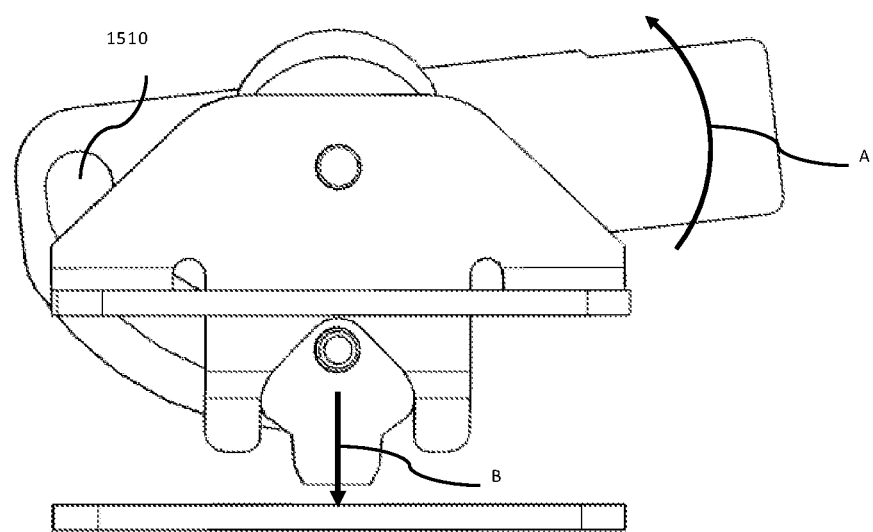

FIGS. 15A and 15B depict manual lock 908 of example furniture system 900. Manual lock 908 includes base plate 1500, glider plate 1502, catch plate 1504, and lever arm 1506. Base plate 1500 is configured to be connected to base 906 or another component directly or indirectly connected to the base of furniture system 900. Base plate 1500 includes notch 1508, which is sized and positioned to receive and be engaged by one end of catch plate 1504.

Glider plate 1502 is configured to be coupled to glider linkage 902, including, for example, to glider link 1002. Catch plate 1504 is moveably connected to glider plate 1502 and lever arm 1506 is rotatably connected to the glider plate at and configured to rotate about pivot 1510. A knob or other protrusion extends from catch plate 1504 into curved slot 1512 in lever arm 1506. Lever arm is configured to be rotated about pivot 1510 in the direction indicated by arrow A to cause catch plate 1504 to translate, in the direction indicated by arrow B, toward and into engagement with notch 1508 of base plate 1500. In this manner, manual lock 908 is configured to mechanically connect glider linkage 902 and base 906 such that glider linkage 902 cannot move regardless of the state of auto-lock linkage 904.

Additional Notes & Examples

Example 1 can include subject matter, such as can include a furniture system including a base, a movable element, a translation assembly and a locking assembly. The translation assembly can include a primary linkage and at least one secondary linkage rotatably mounted to the primary linkage, wherein the primary linkage can be translated along an axis A-A relative to the base to pivot the at least one secondary linkage. The secondary linkage can be operably mounted to the movable element such that translation of the primary linkage moves the movable element. The locking assembly including a lock arm rotatably mounted to the primary linkage. The lock arm being rotatable between an unlocked position in which the lock arm is disengaged to the base and a lock position in which the lock arm is engaged to the base to prevent translation of the primary linkage.

Example 2 can include, or can optionally be combined with the subject matter of Example 1, to optionally include a pivot arm that can be rotatably connected to the primary linkage. The pivot arm can be rotated move the lock arm between the locked position and the unlocked position.

Example 3 can include, or can optionally be combined with the subject matter of Example 2, to optionally include a lift arm extending from the pivot arm such that the lift arm operably engages a seating surface of a seat box. The lift arm can be configured to pivot when weight is applied to the seating surface of the seat box to rotate the pivot arm and correspondingly moving the lock arm into the unlocked position.

Example 4 can include, or can optionally be combined with the subject matter of Example 3, the seat box optionally including a front panel, at least two side walls and a rear panel cooperating to define a seat opening for receiving the translation assembly.

Example 5 can include, or can optionally be combined with the subject matter of Example 4, the movable element optionally including a backrest pivotably mounted to the seat box adjacent the rear panel. The back rest operably connected to the secondary linkage such that rotation of the secondary linkage pivots the back rest.

Example 6 can include, or can optionally be combined with the subject matter of Examples 4-5, the movable element optionally including an extendable foot rest mounted to the seat box adjacent the front panel. The back rest operably connected to the secondary linkage such that rotation of the secondary linkage extends and retracts the foot rest.

Example 7 can include, or can optionally be combined with the subject matter of Examples 3-6, to optionally include an adjustment arm extending from the pivot arm and a set screw adjustably extending from the adjustment arm to the lift arm. The effective length of the set screw can be adjusted to change the angle of the lift arm to the pivot arm.

Example 8 can include, or can optionally be combined with the subject matter of Examples 2-7, to optionally include a spring for biasing the pivot arm to position the locking arm into the locked position.

Example 9 can include, or can optionally be combined with the subject matter of Examples 2-8, to optionally include a base plate defining a plurality of teeth for engaging a stud of the locking arm when the locking arm is rotated into the locked position.

Example 10 can include, or can optionally be combined with the subject matter of Examples 2-9, to optionally include a lock plate mounted to the at least one secondary linkage and configured to rotate the lock plate with the secondary linkage. The lock plate being configured to receive a locking element to prevent rotation of the secondary linkage and, correspondingly, the translation of the primary linkage.

Example 11 can include, or can optionally be combined with the subject matter of Examples 2-10, to optionally include at least one mounting bracket mounted to the at least one secondary linkage and configured to rotate the lock plate with the secondary linkage. The mounting bracket configured to operably connect to at least one movable element to translate rotation of the secondary linkage to the movable element.

Example 12 can include subject matter, such as can include a furniture item including a base, at least one movable element, a translation assembly and a locking assembly. The translation assembly can include a primary linkage and at least one secondary linkage rotatably mounted to the primary linkage, wherein the primary linkage can be translated along an axis A-A relative to the base to pivot the at least one secondary linkage. The secondary linkage can be operably mounted to the movable element such that translation of the primary linkage moves the movable element. The locking assembly including a lock arm rotatably mounted to the primary linkage and a pivot arm. The lock arm being rotatable between an unlocked position in which the lock arm is disengaged to the base and a lock position in which the lock arm is engaged to the base to prevent translation of the primary linkage. The pivot arm can be rotatably connected to the primary linkage and rotated move the lock arm between the locked position and the unlocked position.

Example 13 can include, or can optionally be combined with the subject matter of Example 12, to optionally include a lift arm extending from the pivot arm such that the lift arm operably engages a seating surface of a seat box. The lift arm can be configured to pivot when weight is applied to the seating surface of the seat box to rotate the pivot arm and correspondingly moving the lock arm into the unlocked position.

Example 14 can include, or can optionally be combined with the subject matter of Examples 12-13, the seat box optionally including a front panel, at least two side walls and a rear panel cooperating to define a seat opening for receiving the translation assembly.

Example 15 can include, or can optionally be combined with the subject matter of Examples 12-14, the movable element optionally including a backrest pivotably mounted to the seat box adjacent the rear panel. The back rest operably connected to the secondary linkage such that rotation of the secondary linkage pivots the back rest.

Example 16 can include, or can optionally be combined with the subject matter of Examples 14-15, the movable element optionally including an extendable foot rest mounted to the seat box adjacent the front panel. The back rest operably connected to the secondary linkage such that rotation of the secondary linkage extends and retracts the foot rest.

Example 17 can include, or can optionally be combined with the subject matter of Examples 13-16, to optionally include an adjustment arm extending from the pivot arm and a set screw adjustably extending from the adjustment arm to the lift arm. The effective length of the set screw can be adjusted to change the angle of the lift arm to the pivot arm.

Example 18 can include, or can optionally be combined with the subject matter of Examples 12-17, to optionally include a spring for biasing the pivot arm to position the locking arm into the locked position.

Example 19 can include, or can optionally be combined with the subject matter of Examples 12-18, to optionally include a base plate defining a plurality of teeth for engaging a stud of the locking arm when the locking arm is rotated into the locked position.

Example 20 can include, or can optionally be combined with the subject matter of Examples 12-19, to optionally include a lock plate mounted to the at least one secondary linkage and configured to rotate the lock plate with the secondary linkage. The lock plate being configured to receive a locking element to prevent rotation of the secondary linkage and, correspondingly, the translation of the primary linkage.

Example 21 can include, or can optionally be combined with the subject matter of Examples 12-20, to optionally include at least one mounting bracket mounted to the at least one secondary linkage and configured to rotate the lock plate with the secondary linkage. The mounting bracket configured to operably connect to at least one movable element to translate rotation of the secondary linkage to the movable element.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific embodiments in which the present subject matter can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment/example. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The invention claimed is:

1. A furniture system comprising:
    a base configured to be disposed on a flat surface and to be connected to an article of furniture;
    a first linkage connected to the base and configured to be connected to the article of furniture, the first linkage configured to be actuated to cause the article of furniture to translate relative to the base; and
    a second linkage connected to the first linkage;
    a lock plate rotatable with the second linkage when the first linkage is translated relative to the base;
    a locking element comprising a removable rod coupled to the base configured to engage the lock plate, wherein:
    the lock plate is biased into a locked state and engaged by the locking element in a lock position in which the lock plate prevents movement of the first linkage; and
    the second linkage is configured to be actuated by an applied force into an unlocked state in which, in response to the applied force, the locking element is laterally slid into an unlocked position and the lock plate is disengaged from the locking element and allows movement of the first linkage.

2. The furniture system of claim 1, wherein the first linkage is configured to cause the article of furniture to translate relative to the base along an approximately linear path approximately parallel to the flat surface.

3. The furniture system of claim 1, wherein the first linkage comprises a four-bar linkage.

4. The furniture system of claim 3, wherein the first linkage comprises:
    a ground link comprising a portion of the base or a stationary structure connected directly or indirectly to the base;
    a glider link configured to translate along an approximately linear path approximately parallel to the flat surface upon actuation of the first linkage;
    a first link pivotally connected to the base link and pivotally connected to the first link; and
    a second link pivotally connected to the base link and pivotally connected to the glider link.

5. The furniture system of claim 1, wherein the second linkage comprises a four-bar linkage.

6. The furniture system of claim 5, wherein the second linkage comprises: a first link, a second link, and a lock link, wherein:
    the lock link is configured to, upon actuation of the second linkage by the applied force, unlock and allow movement of the first linkage; and
    the first link is configured to, upon actuation of the second linkage by the applied force, move the second link; and
    the second link pivotally connected to the lock link and configured to, upon actuation of the second linkage by the applied force, rotate the lock link.

7. The furniture system of claim 6, wherein each of the first link and the second link is pivotally connected to the first linkage.

8. The furniture system of claim 7, wherein the first link and the second link are pivotally connected to a moveable element of the first linkage.

9. The furniture system of claim 6, further comprising:
    a ratchet, the ratchet being connected directly or indirectly to the base and comprising a plurality of teeth; and
    a catch, the latch being connected to the lock link, wherein:
    in the locked state of the second linkage, the second linkage positions the lock link such that the catch is received in and engaged with one of the plurality of teeth of the ratchet; and
    in the unlocked state of the second linkage, the second linkage positions the lock link such that the catch is disengaged from all of the plurality of teeth of the ratchet.

10. The furniture system of claim 6, further comprising a spring connected to the first link and connected directly or indirectly to the base, the spring biasing the second linkage into the locked state.

11. The furniture system of claim 1, the second linkage further comprising a pivot paddle, the pivot paddle being connected to and configured to move in synchrony with a driver link of the second linkage, and the pivot paddle being positioned to receive and rotate in response to the applied force.

12. The furniture system of claim 11, wherein the pivot paddle comprises an approximately straight portion and a curved distal end, the curved distal end being positioned to receive and rotate in response to the applied force.

13. The furniture system of claim 11, wherein the applied force comprises a translational force and the pivot paddle is configured to rotate in response to the translational applied force.

14. The furniture system of claim 1, further comprising a manual lock, the manual lock connected to the first linkage and configured to be manually operated to move the manual lock into a locked state or an unlocked state, wherein, in the locked state, the manual lock prevents movement of the first linkage regardless of the state of the second linkage.

15. The furniture system of claim 14, wherein the manual lock comprises a catch and a lever, the lever configured to be manually operated to move the catch into and out of engagement with the base or a stationary structure connected directly or indirectly to the base.

16. The furniture system of claim 14, wherein the lever is configured to be manually rotated to translate the catch into and out of engagement with the base or a stationary structure connected directly or indirectly to the base.

17. An article of furniture comprising:
 a chair body;
 a base configured to be disposed on a flat surface;
 a first linkage connected to the base and to the chair body, the first linkage configured to be actuated to cause the chair body to translate relative to the base; and
 a second linkage connected to the first linkage and a lock plate rotatable with the second linkage when the first linkage is translated relative to the base;
 a locking element comprising a removable rod coupled to the base configured to engage the lock plate, wherein:
 the lock plate is biased into a locked state and engaged by the locking element in a lock position in which the lock plate prevents movement of the first linkage; and
 the second linkage is configured to be actuated by an applied force into an unlocked state in which, in response to the applied force, the locking element is laterally slid into an unlocked position, and the lock plate is disengaged from the locking element and allows movement of the first linkage, the applied force being a weight on a seat of the chair body.

18. The article of furniture of claim 2, wherein the lock plate is further configured to rotate with the secondary linkage when the primary linkage is translated along the linear path parallel to the flat surface.

* * * * *